United States Patent [19]

Plichta et al.

[11] Patent Number: 5,238,759
[45] Date of Patent: Aug. 24, 1993

[54] FLEXIBLE SOLID ELECTROLYTE FOR USE IN SOLID STATE CELLS AND SOLID STATE CELL INCLUDING SAID FLEXIBLE SOLID ELECTROLYTE

[75] Inventors: Edward J. Plichta, Howell; Wishvender K. Behl, Ocean, both of N.J.

[73] Assignee: The United States of America as represented by the Secretary of the Army, Washington, D.C.

[21] Appl. No.: 862,620

[22] Filed: Apr. 1, 1992

[51] Int. Cl.$^5$ .......................... H01M 6/18; H01M 4/02
[52] U.S. Cl. .................................... 429/192; 429/193; 429/209
[58] Field of Search ................ 429/192, 209, 193, 122

[56] References Cited

U.S. PATENT DOCUMENTS

3,717,506  2/1973  Hopkins ................... 429/32
4,828,369  5/1989  Hotomi ................ 315/111.21 X

*Primary Examiner*—John S. Maples
*Attorney, Agent, or Firm*—Michael Zelenka; Roy E. Gordon

[57] ABSTRACT

A solid state cell is provided including a sheet of flexible solid electrolyte less than 0.1 mm in thickness between two electrodes wherein the flexible solid electrolyte is obtained from a mixture of about 80 to 95 weight percent solid electrolyte with about 5 to 20 weight percent of powdered Teflon.

36 Claims, No Drawings

FLEXIBLE SOLID ELECTROLYTE FOR USE IN SOLID STATE CELLS AND SOLID STATE CELL INCLUDING SAID FLEXIBLE SOLID ELECTROLYTE

GOVERNMENT INTEREST

The invention described herein may be manufactured, used, and licensed by or for the Government for governmental purposes without the payment to us of any royalty thereon.

FIELD OF INVENTION

This invention relates in general to the art of solid state cells, and in particular to a method of making a flexible solid electrolyte for use in solid state cells, to a flexible solid electrolyte so made, and to a solid state cell including said flexible solid electrolyte.

BACKGROUND OF THE INVENTION

Many solid state electrolytes used in solid state cells have used ionically conductive ceramics, glasses, and crystalline salts that are inherently brittle and thereby difficult to manufacture into thin structures. The most common method used to prepare these materials as electrolytes for solid state cells has been through pressed powder pelletization that may include sintering or fusing of the pellets at elevated temperatures. The pelletization process however, has not been suitable for preparing thin electrolyte structures (<0.5mm thick) that are needed for higher power solid state cell designs. This is significant since a high power solid state cell would provide power for applications in robotics, electric vehicle propulsion, weapon systems and communications.

SUMMARY OF THE INVENTION

The general object of this invention is to provide a method of making a flexible, ionically conductive solid electrolyte for use in solid state batteries. A more particular object of the invention is to provide a method of preparing a flexible lithium tetrachloroaluminate ($LiAlCl_4$) electrolyte for use in solid state cells. A still further object of the invention is to provide a method of making a flexible $LiAlCl$: electrolyte that is less fragile, and capable of being prepared thinner than press powder pelletization processes, thereby allowing the preparation of higher power solid state cells.

It has now been found that the aforementioned objects can be attained and a flexible solid electrolyte provided by a method of preparation containing Teflon powder as a mechanical binder that is roll milled with the solid electrolyte component.

More particularly, according to the invention, a flexible solid electrolyte is prepared by the steps of (A) mixing about 80 to about 95 weight percent of powdered $LiAlCl_4$ with about 5 to 20 weight percent of Teflon powder, (B) ball or roll milling the dry mixture until the Teflon particles thoroughly bind the electrolyte powder into a stiff coherent dough, (C) roll or static pressing the milled mixture to a thickness of about 1 mm and (D) forming a cell sandwich by placing the rolled electrolyte mixture between an anode and a cathode and further reducing the cell thickness to where the electrolyte layer is less than 0.1 mm thick. This step will also form a cohesive bond between the solid electrolyte layer and the electrode surfaces.

The solid electrolyte prepared according to this method is found to be flexible, freestanding, cohesively bonded to the electrode surfaces, and capable of being used in solid state cells at elevated temperatures without physical degradation. In this connection, lithium intercalating anode and cathode materials are used in the system.

DESCRIPTION OF THE PREFERRED EMBODIMENT

A flexible solid $LiAlCl_4$ electrolyte preparation utilizing 90 weight percent $LiAlCl_4$ (−400 mesh powder, Anderson Physics grade) and, 10 weight percent Teflon as the binder is roll milled into a coherent stiff dough and roll pressed into 1 mm thick freestanding flexible sheets. The Teflon powder is obtained by precipitation from Dupont Teflon-60 aqueous emulsion using acetone. The precipitated Teflon is vacuum filtered and washed with acetone followed by vacuum drying at 100° C. for 24 hours. The following steps are performed in an argon filled glove box to avoid moisture contamination of the solid electrolyte. The solid electrolyte ($LiAlCl_4$) is ground to a fine mesh size (−400 mesh). A mixture of 90 weight percent ground $LiAlCl_4$ and 10 weight percent dried Teflon is mechanically milled until a stiff coherent dough is obtained. The dough is then placed between two plastic sheets and roll pressed to a thickness of about 1 mm. Two thin film electrodes (anode and cathode) that are prepared onto metal foils are placed on either side of the rolled electrolyte sheet. The stacked cell components are then placed in between 2 plastic sheets and further roll pressed until the electrolyte layer thickness is reduced to less than 0.1 mm. The cell fabricated using the aforementioned method produces a solid state cell that has a flexible, cohesive, and freestanding characteristic that could not be obtained previously with electrolyte prepared using press powder pelletization.

The solid electrolyte in the invention can be any ionically conductive electrolyte material or mixture thereof. These include ionically conductive compounds generally referred to as "Lisicon" or inorganic ceramic materials that are lithium ion conducting. A preferred "Lisicon" compound is $Li_{14}ZnGe_4O_{16}$. The ionically conductive materials also include compounds generally referred to as "Nasicon" or inorganic ceramic materials that are sodium ion conducting. Preferred "Nasicon" compounds are $Na_{(1+x)}Zr_2Si_xP_{(3-x)}O_{12}$ and $Na_3Zr_2Si_2PO_{12}$. The ionically conductive compounds can also be beta aluminas. These include materials such as $Na_{1.2}Al_{11}O_{17.1}$, $Na_{1-x}NiAl_{11}O_{17+x/2}$, $Na_{1.67}MgAl_{10.33}O_{17}$, $Na_{1-x}Ni\ Al_{11-x}O_{17}$, and $Na_{1-x}Zr_1Al_{11-x}O_{17}$. The solid electrolyte may also be of the ionically conductive compound alkali tetrahaloaluminates having the general formula $XAlY_4$ where X may be Li, Na, K, Rb or Cs, and Y may be Cl, Br, I, or F. Preferred among these compounds is $LiAlCl_4$.

We wish it to be understood that we do not desire to be limited to the exact details of construction as described for obvious modifications will occur to a person skilled in the art.

What is claimed is:

1. A flexible solid electrolyte for use in solid state cells, said flexible solid electrolyte comprising a milled mixture of about 80 to 95 weight percent solid electrolyte with about 5 to 20 weight percent of powdered Teflon and wherein the solid electrolyte is of the ionically conductive compounds alkali tetrahaloaluminates having the general formula $XAlY_4$ where X is a metallic element selected from the group consisting of Li, Na, K, Rb and Cs, and where Y is a halogen selected from the group consisting of Cl, Br, I and F.

2. A flexible solid electrolyte for use in solid state cells, said flexible solid electrolyte comprising a milled mixture of about 80 to 95 weight percent solid electrolyte with about 5 to 20 weight percent of powdered Teflon and wherein the solid electrolyte is $LiAlCl_4$.

3. A flexible solid electrolyte for use in solid state cells, said flexible solid electrolyte comprising a milled mixture of about 90 weight percent $LiAlCl_4$ with about 10 weight percent of powdered Teflon.

4. A flexible solid electrolyte for use in solid state cells, said flexible solid electrolyte comprising a milled mixture of about 80 to 95 weight percent solid electrolyte with about 5 to 20 weight percent of powdered Teflon and wherein the solid electrolyte is of the ionically conductive compounds that are inorganic ceramic materials that are lithium ion conducting and referred to as Lisicon.

5. A flexible solid electrolyte for use in solid state cells, said flexible solid electrolyte comprising a milled mixture of about 80 to 95 weight percent solid electrolyte with about 5 to 20 weight percent of powdered Teflon and wherein the solid electrolyte is $Li_{14}Zr_1Ge_4O_{16}$.

6. A flexible solid electrolyte for use in solid state cells, said flexible solid electrolyte comprising a milled mixture of about 80 to 95 weight percent solid electrolyte with about 5 to 20 weight percent of powdered Teflon ad wherein the solid electrolyte is of the ionically conductive compounds that are inorganic ceramic materials that are sodium ion conducting and referred to as Nasicon.

7. A flexible solid electrolyte for use in solid state cells, said flexible solid electrolyte comprising a milled mixture of about 80 to 95 weight percent solid electrolyte with about 5 to 20 weight percent of powdered Teflon, and wherein the solid electrolyte is selected from the group consisting of $Na_{(1+x)}Zr_2Si_xP_{(3-x)}O_{12}$ and $Na_3Zr_2Si_2PO_{12}$.

8. A flexible solid electrolyte for use in solid state cells, said flexible solid electrolyte comprising a milled mixture of about 80 to 95 weight percent solid electrolyte with about 5 to 20 weight percent of powdered Teflon, and wherein the solid electrolyte is $Na_{(1+x)}Zr_2Si_xP_{(3-x)}O_{12}$.

9. A flexible solid electrolyte for use in solid state cells, said flexible solid electrolyte comprising a milled mixture of about 80 to 95 weight percent solid electrolyte with about 5 to 20 weight percent of powdered Teflon, and wherein the solid electrolyte is $Na_3Zr_2Si_2PO_{12}$.

10. A flexible solid electrolyte for use in solid state cells, said flexible solid electrolyte comprising a milled mixture of about 80 to 95 weight percent solid electrolyte with about 5 to 20 weight percent of powdered Teflon, and wherein the solid electrolyte is of the ionically conductive compounds referred to as beta alumina.

11. A flexible solid electrolyte for use in solid state cells, said flexible solid electrolyte comprising a milled mixture of about 80 to 95 weight percent solid electrolyte with about 5 to 20 weight percent of powdered Teflon, and wherein the solid electrolyte is selected from the group consisting of $Na_{1.2}Al_{11}O_{17.1}$, $Na_{1+x}NiAl_{11}O_{17+x/2}$, $Na_{1.67}MgAl_{10.33}O_{17}$, $Na_{1+x}MgAl_{11-x}O_{17}$, $Na_{1+x}NiAl_{11-x}O_{17}$, and $Na_{1+x}Zr_1Al_{11-x}O_{17}$.

12. A flexible solid electrolyte for use in solid state cells, said flexible solid electrolyte comprising a milled mixture of about 80 to 95 weight percent solid electrolyte with about 5 to 20 weight percent of powdered Teflon, and wherein the solid electrolyte is $Na_{1.2}Al_{11}O_{17.1}$.

13. A flexible solid electrolyte for use in solid state cells, said flexible solid electrolyte comprising a milled mixture of about 80 to 95 weight percent solid electrolyte with about 5 to 20 weight percent of powdered Teflon, and wherein the solid electrolyte is $Na_{1+x}NiAl_{11}O_{17+x/2}$.

14. A flexible solid electrolyte for use in solid state cell, said flexible solid electrolyte comprising a milled mixture of about 80 to 95 weight percent solid electrolyte with about 5 to a 20 weight percent of powdered Teflon, and wherein the solid electrolyte is $Na_{1.67}NgAl_{10.33}O_{17}$.

15. A flexible solid electrolyte for use in solid state cells, said flexible solid electrolyte comprising a milled mixture of about 80 to 95 weight percent solid electrolyte with about 5 to 20 weight percent of powdered Teflon, and wherein the solid electrolyte is $Na_{1+x}MgAl_{11-x}O_{17}$.

16. A flexible solid electrolyte comprising a milled mixture of about 80 to 95 weight percent solid electrolyte with about 5 to 20 weight percent of powdered Teflon, and wherein the solid electrolyte is $Na_{1-x}NiAl_{11-x}O_{17}$.

17. A flexible solid electrolyte comprising a milled mixture of about 80 to 95 weight percent solid electrolyte with about 5 to 20 weight percent of powdered Teflon, and wherein the solid electrolyte is $Na_{1+x}Ar_1Al_{11-x}O_{17}$.

18. A flexible solid electrolyte comprising a milled mixture of about 80 to 95 weight percent solid electrolyte with about 5 to 20 weight percent of powdered Teflon, and wherein the solid electrolyte is LiN.

19. A solid state cell including a sheet of flexible solid electrolyte less than 0.1 mm in thickness between two electrodes wherein the flexible solid electrolyte is obtained from a mixture of about 80 to 95 weight percent solid electrolyte with about 5 to 20 percent of powdered Teflon, and wherein the solid electrolyte is of the ionically conductive compounds alkali tetrahaloaluminate having the general formula $XAlY_4$ where X is a metallic element selected from the group consisting of Li, Na, K, Rb and Cs, and where Y is a halogen selected from the group consisting of Cl, Br, I and F.

20. A solid state cell according to claim 19 wherein the alkali tetrahaloaluminate is $LiAlCl_4$.

21. A solid state cell including a sheet of flexible solid electrolyte less than 0.1 mm in thickness between two electrodes wherein the flexible solid electrolyte is obtained from a mixture of about 80 to 95 weight percent solid electrolyte with about 5 to 20 percent of powdered Teflon, and wherein about 90 weight percent of $LiAlCl_4$ is mixed with about 10 weight percent of Teflon.

22. A solid state cell including a sheet of flexible solid electrolyte less than 0.1 mm in thickness between two electrodes wherein the flexible solid electrolyte is obtained from a mixture of about 80 to 95 weight percent solid electrolyte with about 5 to 20 percent of powdered Teflon, and wherein the solid electrolyte is of the ionically conductive compounds that are inorganic ceramic materials that are lithium ion conducting and generally referred to as Lisicon.

23. A solid state cell including a sheet of flexible solid electrolyte less than 0.1 mm in thickness between two electrodes wherein the flexible solid electrolyte is obtained from a mixture of about 80 to 95 weight percent solid electrolyte with about 5 to 20 percent of powdered Teflon, and wherein the Lisicon compound is $Li_{14}Zr_1Ge_4O_{16}$.

24. A solid state cell including a sheet of flexible solid electrolyte less than 0.1 mm in thickness between two electrodes wherein the flexible solid electrolyte is obtained from a mixture of about 80 to 95 weight percent solid electrolyte with about 5 to 20 percent of powdered Teflon, and wherein the solid electrolyte is of the ionically conductive compounds that are inorganic materials that are sodium ion conducting and referred to as Nasicon.

25. A solid state cell including a sheet of flexible solid electrolyte less than 0.1 mm in thickness between two electrodes wherein the flexible solid electrolyte is obtained from a mixture of about 80 to 95 weight percent solid electrolyte with about 5 to 20 percent of powdered Teflon, and wherein the solid electrolyte is selected from the group consisting of $Na_{(1+x)}Zr_2Si_xP_{(3-x)}O_{12}$ and $Na_3Zr_2Si_2PO_{12}$.

26. A solid state cell including a sheet of flexible solid electrolyte less than 0.1 mm in thickness between two electrodes wherein the flexible solid electrolyte is obtained from a mixture of about 80 to 95 weight percent solid electrolyte with about 5 to 20 percent of powdered Teflon, and wherein the solid electrolyte is $Na_{(1+x)}Zr_2Si_xP_{(3-x)}O_{12}$.

27. A solid state cell including a sheet of flexible solid electrolyte less than 0.1 mm in thickness between two electrodes wherein the flexible solid electrolyte is obtained from a mixture of about 80 to 95 weight percent solid electrolyte with about 5 to 20 percent of powdered Teflon, and wherein the solid electrolyte is $Na_3Zr_2Si_2PO_{12}$.

28. A solid state cell including a sheet of flexible solid electrolyte less than 0.1 mm in thickness between two electrodes wherein the flexible solid electrolyte is obtained from a mixture of about 80 to 95 weight percent solid electrolyte with about 5 to 20 percent of powdered Teflon, and wherein the solid electrolyte is of the ionically conductive compounds generally referred to as beta alumina.

29. A solid state cell including a sheet of flexible solid electrolyte less than 0.1 mm in thickness between two electrodes wherein the flexible solid electrolyte is obtained from a mixture of about 80 to 95 weight percent solid electrolyte with about 5 to 20 percent of powdered Teflon, and wherein the solid electrolyte is selected from the group consisting of $Na_{1.2}Al_{11}O_{17.1}$, $Na_{1-x}NiAl_{11}O_{17+x/2}$, $Na_{1.67}MgAl_{10.33}O_{17}$, $Na_{1+x}MgAl_{11-x}O_{17}$, $Na_{1+x}NiAl_{11-x}O_{17}$, and $Na_{1+x}Zr_1Al_{11-x}O_{17}$.

30. A solid state cell including a sheet of flexible solid electrolyte less than 0.1 mm in thickness between two electrodes wherein the flexible solid electrolyte is obtained from a mixture of about 80 to 95 weight percent solid electrolyte with about 5 to 20 percent of powdered Teflon, and wherein the solid electrolyte is $Na_{1.2}Al_{1.1}O_{17.1}$.

31. A solid state cell including a sheet of flexible solid electrolyte less than 0..1 mm in thickness between two electrodes wherein the flexible solid electrolyte is obtained from a mixture of about 80 to 95 weight percent solid electrolyte with about 5 to 20 percent of powdered Teflon, and wherein the solid electrolyte is $Na_{1+x}NiAl_{11}O_{17+x/2}$.

32. A solid state cell including a sheet of flexible solid electrolyte less than 0.1 mm in thickness between two electrodes wherein the flexible solid electrolyte is obtained from a mixture of about 80 to 95 weight percent solid electrolyte with about 5 to 20 percent of powdered Teflon, and wherein the solid electrolyte is $Na_{1.67}MgAl_{10.33}17$.

33. A solid state cell including a sheet of flexible solid electrolyte less than 0.1 mm in thickness between two electrodes wherein the flexible solid electrolyte is obtained from a mixture of about 80 to 95 weight percent solid electrolyte with about 5 to 20 percent of powdered Teflon, and wherein the solid electrolyte is $Na_{1+x}MgAl_{11-x}O_{17}$.

34. A solid state cell including a sheet of flexible solid electrolyte less than 0.1 mm in thickness between two electrodes wherein the flexible solid electrolyte is obtained from a mixture of about 80 to 95 weight percent solid electrolyte with about 5 to 20 percent of powdered Teflon, and wherein the solid electrolyte is $Na_{1-x}NiAl_{11-x}O_{17}$.

35. A solid state cell including a sheet of flexible solid electrolyte less than 0.1 mm in thickness between two electrodes wherein the flexible solid electrolyte is obtained from a mixture of about 80 to 95 weight percent solid electrolyte with about 5 to 20 percent of powdered Teflon, and wherein the solid electrolyte is $Na_{1-x}Zr_1Al_{11-x}O_{17}$.

36. A solid state cell including a sheet of flexible solid electrolyte less than 0.1 mm in thickness between two electrodes wherein the flexible solid electrolyte is obtained from a mixture of about 80 to 95 weight percent solid electrolyte with about 5 to 20 percent of powdered Teflon, and wherein the solid electrolyte is LiN.

* * * * *